United States Patent [19]
Thompson et al.

[11] Patent Number: 5,953,057
[45] Date of Patent: Sep. 14, 1999

[54] VIDEO TERMINATION DETECTOR WITH DATA RECEIVER

[75] Inventors: Edwin S. Thompson, Campbell Hall, N.Y.; Lawrence R. Mills; James R. Paolantonio, both of Coral Springs, Fla.

[73] Assignee: Sensormatic Electronics Corporation, Boca Raton, Fla.

[21] Appl. No.: 08/706,843

[22] Filed: Sep. 3, 1996

[51] Int. Cl.⁶ .......................... H04N 17/00; H04N 17/02
[52] U.S. Cl. ........................ 348/192; 348/123; 348/180; 348/143; 455/67.1; 455/67.7; 340/652; 340/653
[58] Field of Search .................. 348/6, 8, 12, 9, 348/10, 192–193, 143, 180; 455/3.1, 5.1, 6.3, 8, 9, 67.1, 67.7, 226.1; 375/257; 333/4, 124, 17.3, 18; 324/512, 522, 5, 25, 526; 340/310.06, 649, 650, 651, 5.38, 652–653; 329/512, 525

[56] References Cited

U.S. PATENT DOCUMENTS

| | | | |
|---|---|---|---|
| 3,355,729 | 11/1967 | Dayson | 340/652 |
| 3,496,416 | 2/1970 | Agnew et al. | 340/652 |
| 3,691,295 | 9/1972 | Fisk | 178/58 |
| 3,812,287 | 5/1974 | Lemelson | 178/6.8 |
| 4,135,209 | 1/1979 | Logan | 348/180 |
| 4,234,964 | 11/1980 | Cieslak et al. | 455/226.1 |
| 4,257,123 | 3/1981 | Birt et al. | 455/115 |
| 4,321,643 | 3/1982 | Vernier | 361/48 |
| 4,419,765 | 12/1983 | Wycoff et al. | 455/36 |
| 4,425,578 | 1/1984 | Haselwood et al. | 358/84 |
| 4,764,759 | 8/1988 | Braun et al. | 340/653 |
| 4,985,901 | 1/1991 | Cohen et al. | 348/192 |
| 5,208,666 | 5/1993 | Elkind et al. | 348/192 |
| 5,231,375 | 7/1993 | Sanders et al. | 340/568 |
| 5,253,070 | 10/1993 | Hong | 358/209 |
| 5,264,929 | 11/1993 | Yamaguchi | 358/108 |
| 5,287,186 | 2/1994 | Takamori | 348/795 |
| 5,295,178 | 3/1994 | Nickel et al. | 455/9 |
| 5,444,564 | 8/1995 | Newberg | 333/32 |
| 5,455,561 | 10/1995 | Brown | 340/541 |
| 5,459,440 | 10/1995 | Claridge et al. | 333/17.3 |
| 5,488,306 | 1/1996 | Bonaccio | 324/539 |
| 5,559,440 | 9/1996 | Lopresti et al. | 324/607 |
| 5,570,343 | 10/1996 | Bishop et al. | 455/8 |
| 5,583,796 | 12/1996 | Reese | 364/550 |

FOREIGN PATENT DOCUMENTS

705008 A2  4/1996  European Pat. Off. ........ H04L 25/02

Primary Examiner—John K. Peng
Assistant Examiner—Linus H. Lo
Attorney, Agent, or Firm—Robin, Blecker & Daley

[57] ABSTRACT

An apparatus for detecting the properly terminated connection between video components transmitting a video signal from one video component to the other. The video and/or data signal is input to a resistance element. A first comparison input device is connected to the input side of the resistance element and a second comparison input device is connected to the output side of the resistance element. A comparison unit is provided for comparing the voltages from the first comparison input device and the second comparison input device to determine whether there is a voltage drop across the resistance element thereby determining whether the video component is properly terminated. A data processing element connected to the output of the comparison unit receives data from the comparison unit which is detected across the resistance element.

30 Claims, 2 Drawing Sheets

VIDEO TERMINATION DETECTOR WITH DATA RECEIVER

FIELD OF THE INVENTION

This invention relates to an apparatus and method for detecting a break in the electrical connection between video components, and more particularly, to detecting the connection of a properly terminated video component while incorporating a data detector/receiver to facilitate control functions on a single coaxial cable.

BACKGROUND OF THE INVENTION

The integrity of video surveillance systems can be compromised by cutting or otherwise disconnecting video and/or data cables between the monitoring system and the remote camera device. Loss of the control data signal is often detected immediately due to the common use of status polling algorithms that quickly identify lost communication links. Thus, the operator is alerted and the problem found before substantial risk is incurred. The loss of the video signal however, often goes unnoticed, particularly in medium to large systems, until there is a need to view the image from the remote camera.

In the past, the problem of compromised video signal integrity has been recognized and the solution has been to add circuits to the monitoring equipment at the receiving end of the system to detect the signal interruption. These systems detect the open circuit condition and report the status to the operator. The shortcoming of this method is that the monitoring equipment is often connected through other devices, i.e. multiplexers, quads, or VCRs, that have no video loss provision. The output of these devices can fool the video loss detection circuits by generating their own video signal, i.e. a blue screen, even if none is present at the input. In addition, none of the devices report an unterminated condition when the signal is present, but the connected device is set to high impedance. Furthermore, where means are provided for detecting improper load termination, these means are usually provided at the receiving end of a system where the video signals are transmitted from the camera or transmitting end to the control and monitoring console at the receiving end.

The requirement for both video and control data signals is common when installing Pan/Tilt/Zoom cameras, which require complex and expensive system wiring. Simplified installation has been addressed in a number of ways but the most desirable is to reduce the cabling to a single coaxial cable. Single coaxial cable systems are available that put video and control data on a single cable, but none detect an unterminated condition. Unterminated video is viewable on a video monitor, and appears brighter than normal, but the condition can be easily mistaken for misadjusted components, i.e. monitor, manual or auto-iris and amplifier gain. Again, this requires troubleshooting time to correct.

It is, therefore, an object of the present invention to provide a means to detect the presence of a proper termination load and thus proper connection on a coaxial cable.

It is a further object of this invention to provide means at the camera or transmitter end of the system to detect the presence of a proper termination load.

It is a further object of this invention to incorporate a control data detector/receiver to facilitate control functions on a single coaxial cable.

SUMMARY OF THE INVENTION

In accordance with the principles of the present invention, the above and other objectives are realized in an apparatus for detecting the properly terminated connection between video components transmitting a video signal from a transmitting video component located at the transmitting end of the system to a receiving video component located at the receiving end of the system. The termination detection means is located at the transmitting end of the system, for example, at the video camera in a CCTV system.

The video signal may be input to a resistance means. A first comparison input means is connected to the input side of the resistance means and a second comparison input means is connected to the output side of the resistance means. A comparison means is provided for comparing the voltages from the first comparison input means and the second comparison input means to determine whether there is a voltage drop across the resistance means thereby determining whether the video component is properly terminated.

A control data processing element may also be connected to the output of said comparison means to receive control data signals from the monitoring or console panel to control the camera functions. Timing circuits for receipt of the control data signals permit the control data signals to be received only during specified timing periods such as during periods when video signals contain no display information, for example, during the vertical interval.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
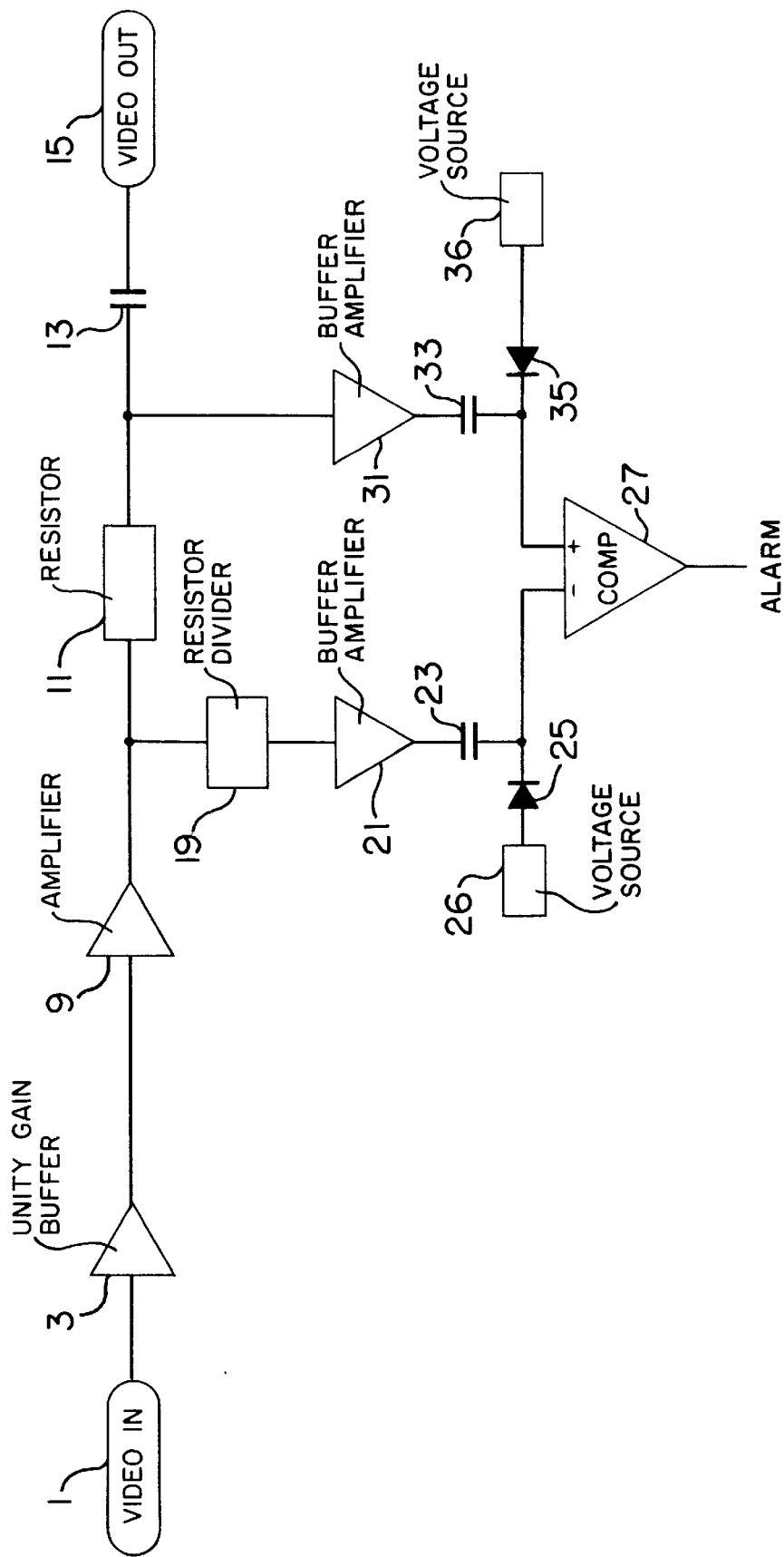
FIG. 1 shows a block diagram of an improved video termination detector in accordance with the principles of the present invention.

FIG. 1 shows a block diagram of an improved video termination detector in accordance with the principles of the present invention. It is to be noted that the termination detection means is located at or adjacent to the transmitting end rather than at the receiving end or monitoring end of the system. Video input 1, which may be a camera or the transmitting video component for transmitting a video signal, is connected to a unity gain buffer 3. The output of buffer 3 is connected to amplifier 9. The output of amplifier 9 is connected to the input side of a resistance means which, in the preferred embodiment may be resistor 11 having a value approximately equal to the value of the termination load at the receiving end of the system. A capacitor 13 may be connected to the output side of resistor 11 and to the video output 15 which is the output to the receiving video component.

A first comparison input means which, in the preferred embodiment, may be circuit elements 19–26 is provided. The output of amplifier 9 is connected via a resistor divider 19 to buffer amplifier 21 which is connected through capacitor 23 to the cathode of diode 25. The anode of diode 25 is connected to a positive D.C. voltage source 26.

A second comparison input means which, in the preferred embodiment may be circuit elements 31–36 is provided. The output side of resistor 11 is also connected to the input of buffer amplifier 31 which is connected through capacitor 33 to the cathode of diode 35. The anode of diode 35 is connected to a positive voltage source 36 which is lower than the voltage source 26.

A comparison means which may be comparator 27, having a positive and a negative input is provided. The negative input is connected to the cathode of diode 25 and the positive input is connected to the cathode of diode 35.

In operation, a video signal being transmitted from a transmitting video component, such as a camera, is applied to the video input 1 and is then buffered by unity gain amplifier 3. The video signal is amplified by a gain of two by amplifier 9. The output of amplifier 9 is then applied to resistor 11 and capacitor 13 and finally output at video output 15 to a receiving video component such as a monitor at a control console (not shown).

The video signal from amplifier 9 is applied to the first comparison input means via a resistor divider 19 and buffer 21 which divides the voltage to approximately 50% of the original amplitude. The output of amplifier 9 is also fed through resistor 11 to the second comparison input via buffer 31. The signal amplitude at the input to buffer 31 is a function of the load applied to the coaxial cable at video output 15. Normally, with 75 ohms termination connected to video output 15, the voltage at buffer 31 will be approximately 50% of the signal level output at amplifier 9. The voltage divider 19 therefore causes the signal amplitude output at the inputs to buffer 21 and buffer 31 to be approximately equal. A different embodiment may achieve the same end result by amplifying the signal in the second comparison input means rather than dividing the voltage in the first comparison input means using voltage divider 19.

The signal output from buffers 21 and 31 then has its DC component controlled or set. In this embodiment, this is done by applying the video signal to capacitors 23 and 33 respectively, which remove the DC component from the video signal. A new DC component is added by clamping the synchronizing tips via diodes 25 and 35 respectively. The DC level applied by voltage source 36 to diode 35 is lower than the DC level applied by voltage source 26 to diode 25. The video signal with the new DC level from diode 25 is then applied to the negative input of comparator 27. The signal with the new DC level from diode 35 is applied to the positive input of comparator 27, providing a voltage threshold to the input of comparator 27 to make allowance for noise and signal variations. This threshold keeps the output of comparator 27 low when the coaxial cable is properly terminated. If the proper termination is removed from video output 15, either by a break in the line or otherwise, the voltage drop across resistor 11 becomes negligible, causing the voltage at the input to amplifier 31 to be about the same as the input to resistor divider 19. Since the first comparison input means reduces the voltage at the negative input to comparator 27 by about one half, the voltage at the positive input to comparator 27 is higher than the negative input to comparator 27 causing the output of comparator 27 to be high. A high output of the comparator 27 causes an alarm condition. Thus, if there is a break in the line to the receiving video component, or if there is any other improper termination at the receiving end, an alarm will result alerting the operator to the improper termination. The alarm condition may be an audible alarm, a visible alarm, a message appearing on a monitor screen or some equivalent mechanism to alert the operator to the improper termination that exists. In an alternative embodiment the comparator connections may be reversed so that instead of a high output from the comparator 27 to cause an alarm, a low output would cause the alarm.

Moreover, rather than an alarm condition, a high output of the comparator 27 may also cause the system to switch to another mode of communication or to an alternate connection for communication, thereby self fixing the communications problem.

Figure 2:
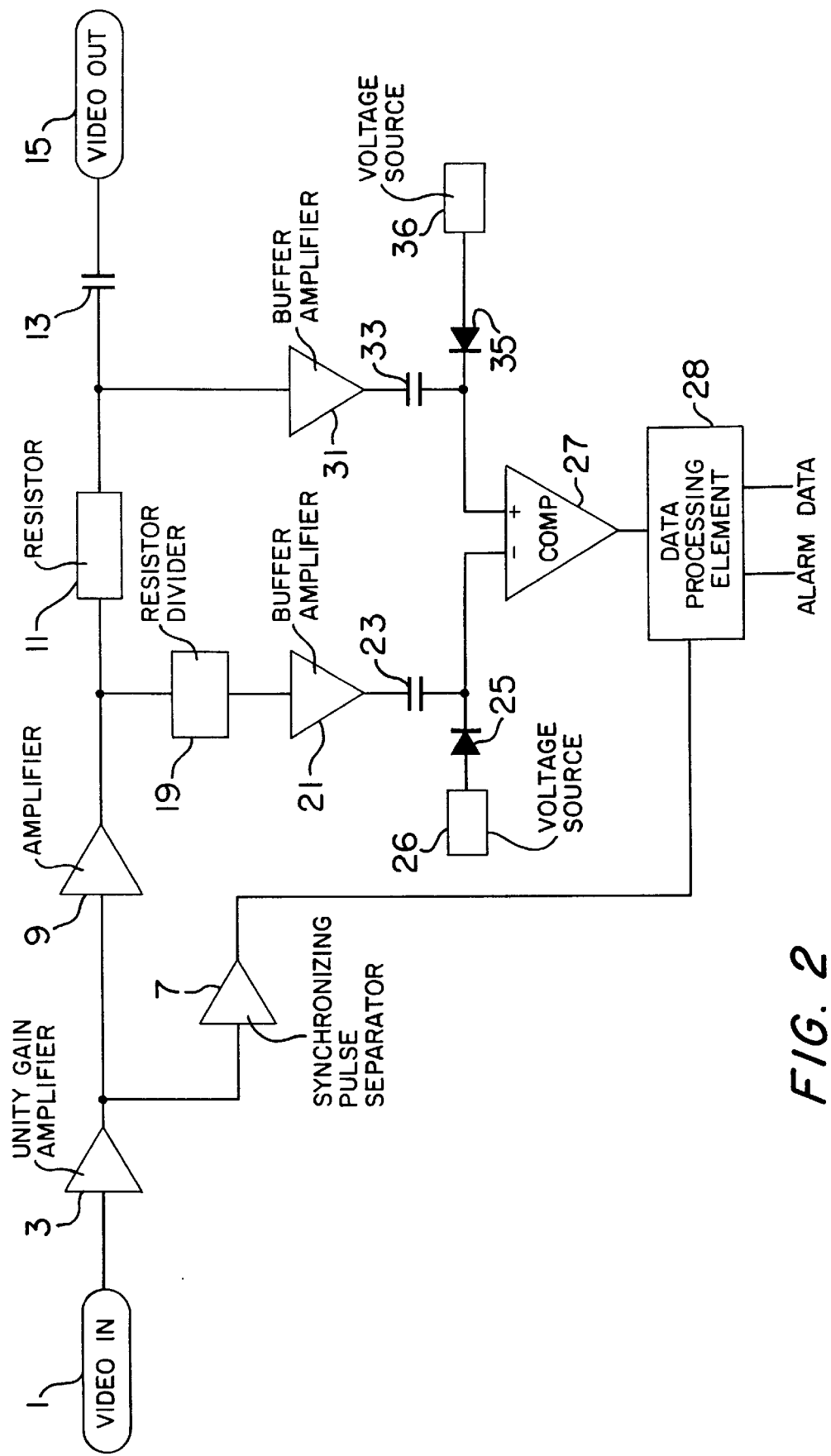
FIG. 2 shows a block diagram of the improved video termination detector with data receiver in accordance with the principles of the present invention.

This invention also provides for communicating camera control data, such as pan, tilt, zoom, iris, focus and programming information from the console or monitoring station back to the camera, utilizing the same circuitry at the camera end for determining proper termination. FIG. 2 shows a block diagram of an improved video termination detector with a control data receiver. Control data signals are fed back on the coaxial cable from the console or monitoring and control station to video output 15, back through capacitor 13 to the second comparison input means.

The embodiment in FIG. 2 is identical to that in FIG. 1 except that data processing element 28 is connected to the output of comparator 27 and to a synchronizing pulse separator 7. The data processing element 28 may be a microprocessor or a programmable logic device or any other type of device which accepts logic signals. The synchronizing pulse separator 7 is connected to the output of buffer 3. The data processing element 28 has two outputs, one for an alarm condition and the other to output control data for controlling the camera functions.

The purpose of control data processing element 28 is to separate the control data signals from the alarm signal which can be done by utilizing the timing when control data signals appear. The video signal is applied to the synchronizing pulse separator 7 to provide a timing reference for control data reception.

Control data signals are sent from a console at a monitoring station in the opposite direction to the direction of the video signals, but only during certain predetermined periods of time when control data is intended to be received such as the Video Vertical Interval, i.e., TV lines 14–18. The control data signals from the receiving end of the system appear as positive voltage pulses fed from video output 15, through capacitor 13 and are detected differentially across resistor 11. The control data signal is blocked by resistor 11 because amplifier 9 is an active element and does not allow the data to change the voltage on the line between amplifier 9 and resistor 11. Thus, the positive voltage pulses of the control data signals cause the input to buffer 31 to be positive for each high data bit. Any control data signal with enough amplitude to exceed the voltage threshold at comparator 27 causes the output of comparator 27 to be high, thus representing the stream of control data bits of the sent control data signal at CMOS/transistor-transistor logic (TTL) compatible levels. The control data is then input into the data processing element 28 for processing using the timing information derived from synchronizing pulse separator 7.

Since the output of comparator 27 is also used to determine if the coaxial termination is present at video output 15, timing circuits are included in the data processing element 28 to receive information from the synchronizing pulse separator 7 to identify the proper TV lines containing the control data so that the data processing element 28 distinguishes between when data should or should not be received. The data is only sent during predetermined times when no active video is being transmitted.

In this manner, the output of comparator 27 is a function of the coaxial termination status at video output 15. If there is a break in the line or improper termination, the output of comparator 27 is continuously high and an alarm will occur. No data will be detected until the proper termination is restored. If the coaxial cable is connected to video output 15, but not properly terminated, this alarm condition may be communicated by a message on a video monitor. In the event that the coaxial cable is totally disconnected, this alarm condition is communicated from data processing element 28 on a data channel using separate wiring. The unterminated status may also be available as a communication failure alarm if a data signal is combined with the video signal on the coaxial cable.

In all cases it is understood that the above-described arrangements are merely illustrative of the many possible specific embodiments which represent applications of the present invention. Numerous and varied other arrangements can readily be devised in accordance with the principles of the present invention without departing from the spirit and scope of the invention. For example, instead of utilizing the differential circuit described above, first input comparison means 19, 21, 23, 25 and 26 could be replaced by a fixed voltage source. Also, both first and second input comparison means, as well as the comparator could be replaced by digitizing and digital processing means.

What is claimed:

1. An apparatus for detecting a properly terminated connection between video components transmitting a video signal voltage from a transmitting video component to a receiving video component, comprising:
    a) resistance means connected between the said two video components;
    b) first comparison input means connected to the input side of said resistance means;
    c) second comparison input means connected to the output side of said resistance means;
    d) comparison means for comparing the voltages of the video signal from said first comparison input means and said second comparison input means to determine whether there is a voltage drop across said resistance means thereby indicating that the video components are properly terminated; and
    e) switching means connected to said comparison means for switching to an alternate connection when there is improper termination between said transmitting video component and said receiving video component.

2. The apparatus of claim 1 wherein said transmitting video component comprises a camera and said receiving video component comprises a video monitor.

3. An apparatus for detecting a properly terminated connection between video components transmitting a video signal voltage from a transmitting video component to a receiving video component, comprising:
    a) resistance means connected between the said two video components;
    b) first comparison input means connected to the input side of said resistance means, said first comparison input means including a voltage divider to reduce the amplitude of the video signal;
    c) second comparison input means connected to the output side of said resistance means; and
    d) comparison means for comparing the voltages of the video signal from said first comparison input means and said second comparison input means, said comparison means comprising a comparator having a first and a second input and a single output and said first input being connected to said second comparison input means and said second input being connected to said first comparison input means to detect a voltage drop across said resistance means thereby indicating proper termination of the video components.

4. The apparatus of claim 3 further comprising an alarm means which is activated by said comparison means when said video components are not properly terminated.

5. The apparatus of claim 3 wherein said apparatus is located adjacent to the transmitting components.

6. The apparatus of claim 3 wherein said resistance means comprises a resistor.

7. The apparatus of claim 3 wherein said second comparison input means includes a capacitor to remove the DC component from the video signal and further includes a diode with its cathode connected to said capacitor and said positive input of said comparator and its anode connected to a positive voltage source which is less than the voltage source connected to the cathode of said capacitor of said first comparison input means to add a new DC component to provide an input threshold in said comparator.

8. An apparatus for detecting a properly terminated connection between video components transmitting a video signal voltage from a transmitting video component to a receiving video component, comprising:
    a) resistance means connected between the said two video components;
    b) first comparison input means connected to the input side of said resistance means, said first comparison input means including a control means to control the DC component in the video signal;
    c) second comparison input means connected to the output side of said resistance means; and
    d) comparison means for comparing the voltages of the video signal from said first comparison input means and said second comparison input means, said comparison means comprising a comparator having a first and a second input and a single output and said first input being connected to said second comparison input means and said second input being connected to said first comparison input means to detect a voltage drop across said resistance means thereby indicating proper termination of the video components.

9. The apparatus of claim 8 wherein said control means comprises a capacitor to remove the DC component from the video signal and further includes a diode with its cathode connected to said capacitor and said negative input of said comparator and its anode connected to a positive voltage source to add a new DC component.

10. An apparatus for detecting a properly terminated connection between video components transmitting a video signal voltage from a transmitting video component to a receiving video component, comprising:
    a) resistance means connected between the said two video components;
    b) first comparison input means connected to the input side of said resistance means;
    c) second comparison input means connected to the output side of said resistance means;
    d) comparison means for comparing the voltages of the video signal from said first comparison input means and said second comparison input means to determine whether there is a voltage drop across said resistance means thereby indicating that the video components are Properly terminated; and
    data processing means connected to said comparison means to receive control data for controlling the functions of said transmitting video component.

11. The apparatus of claim 10 further comprising a data detection means connected to said comparison means for detecting control data sent from the receiving video component end of the connection between said transmitting and receiving video components.

12. The apparatus of claim 10 further comprising a data processing element connected to the output of said comparison means to receive control data for controlling the functions of said video component.

13. The apparatus of claim 10 wherein the control data is present with the video signal but transmitted in the opposite direction and detected across said resistance means.

14. The apparatus of claim 10 further comprising a synchronizing pulse separator to provide a timing reference to said data processing means for receiving control data only during predetermined periods when control data is intended to be received.

15. The apparatus of claim 13 wherein the data comprises camera control data.

16. A method for detecting a Properly terminated connection between video components transmitting a video signal voltage from a transmitting video component to a receiving video component, comprising the steps of:

applying the video signal to a resistance means connected between the said two video components;

comparing the video signal voltage from a first comparison input means connected to the input side of the resistance means and the voltage from a second comparison input means connected to the output side of the resistance means to determine whether there is a voltage drop across the resistance means thereby indicating that the video components are properly terminated; and switching to an alternate connection when there is improper termination between the transmitting video component and the receiving video component.

17. A method for detecting a properly terminated connection between video components transmitting a video signal voltage from a transmitting video component to a receiving video component, comprising the steps of:

applying the video signal to a resistance means connected between the said video components;

reducing the amplitude of the video signal in a first comparison input means using a voltage divider, said first comparison input means being connected to the input side of the resistance means; and comparing the video signal voltage from the first comparison input means as reduced in said reducing step and the voltage from a second comparison input means connected to the output side of the resistance means to determine whether there is a voltage drop across the resistance means thereby indicating that the video components are Properly terminated.

18. The method of claim 17 further comprising the step of activating an alarm means using the comparison means when the video components are not properly terminated.

19. The method of claim 17 wherein the step of comparing is performed adjacent to the transmitting video component.

20. The method of claim 17 wherein the resistance means comprises a resistor.

21. The method of claim 17 wherein the step of comparing the video signal voltages comprises the step of detecting a voltage drop across the resistance using a comparator having a positive input connected the second comparison input means and a negative input connected to the first comparison input means thereby indicating proper termination of the video components.

22. The method of claim 17 further comprising the step of controlling the DC component in the video signal.

23. The method of claim 22 wherein the step of controlling the DC component includes the step removing the DC component from the video signal in the first comparison input means using a capacitor and the step of providing a new DC component in the first comparison input means using a diode with its cathode connected to said capacitor and the negative input of the comparator and its anode connected to a positive voltage source.

24. The method of claim 21 further comprising the step of removing the DC component from the video signal in the second comparison input means using a capacitor and the step of providing a new DC component in the second comparison input means using a diode with its cathode connected to the capacitor and the positive input of the comparator and its anode connected to a positive voltage source which is less than the voltage source connected to the cathode of said capacitor of the first comparison input means providing an input threshold.

25. A method for detecting a Properly terminated connected between video components transmitting a video signal voltage from a transmitting video component to a receiving video component, comprising the steps of:

applying the video signal to a resistance means connected between the said two video components;

comparing the video signal voltage from a first comparison input means connected to the input side of the resistance means and the voltage from a second comparison input means connected to the output side of the resistance means to determine whether there is a voltage drop across the resistance means thereby indicating that the video components are properly terminated; and receiving control data for controlling the functions of the transmitting video component.

26. The method of claim 25 further comprising the step of detecting control data sent from the receiving end of the connection between said transmitting and receiving video components using a data detection means located at the transmitting end of the connection between said transmitting and receiving video components.

27. The method of claim 25 further comprising the step of receiving control data for controlling the functions of the transmitting video component using a data processing means connected to the comparison means.

28. The method of claim 27 wherein the control data is present with the video signal but transmitted in the opposite direction and detected across the resistance means.

29. The method of claim 27 further comprising the step of the providing a timing reference to the data processing means for receiving control data only during predetermined periods when control data is intended to be received.

30. The method of claim 25 wherein the data comprises camera control data.

\* \* \* \* \*

UNITED STATES PATENT AND TRADEMARK OFFICE
CERTIFICATE OF CORRECTION

PATENT NO. : 5,953,057
DATED : September 14, 1999
INVENTOR(S) : Edwin Thompson, et al.

It is certified that error appears in the above-identified patent and that said Letters Patent are hereby corrected as shown below:

Col. 7, line 17, delete "Properly" and insert -- properly --.
Col. 7, line 50, delete "Properly" and insert -- properly --.
Col. 8, line 25, delete "Properly" and insert -- properly --.

Signed and Sealed this

Twenty-fourth Day of October, 2000

Attest:

Q. TODD DICKINSON

*Attesting Officer*      *Director of Patents and Trademarks*